(12) United States Patent
Stelzer et al.

(10) Patent No.: US 7,192,462 B2
(45) Date of Patent: Mar. 20, 2007

(54) ENGINE AIR FILTER AND SEALING SYSTEM

(75) Inventors: James F. Stelzer, St. Louis, MO (US); Thomas L. Newman, St. Louis, MO (US)

(73) Assignee: Aerospace Filtration Systems, Inc., St. Charles, MO (US)

( * ) Notice: Subject to any disclaimer, the term of this patent is extended or adjusted under 35 U.S.C. 154(b) by 57 days.

(21) Appl. No.: 10/823,934

(22) Filed: Apr. 14, 2004

(65) Prior Publication Data

US 2005/0229558 A1    Oct. 20, 2005

(51) Int. Cl.
*B64D 33/02* (2006.01)
*F02C 7/04* (2006.01)
*F02M 35/02* (2006.01)

(52) U.S. Cl. ............................ 55/306; 55/337; 55/347; 55/348; 55/456; 55/385.1; 55/502; 55/505; 60/39.092; 123/198 E; 181/276; 244/53 B (58) Field of Classification Search .................. 55/306, 55/337, 347, 348, 456, 385.1, 502, 505; 123/198 E; 181/278; 244/53 B; 60/39.092
See application file for complete search history.

(56) References Cited

U.S. PATENT DOCUMENTS

| | | | | | |
|---|---|---|---|---|---|
| 2,553,512 | A | * | 5/1951 | Cotton, Jr. | 55/306 |
| 2,846,023 | A | * | 8/1958 | Millman | 55/306 |
| 2,944,631 | A | * | 7/1960 | Kerry et al. | 55/306 |
| 3,421,296 | A | * | 1/1969 | Beurer, Sr. | 55/306 |
| 3,449,891 | A | * | 6/1969 | Amelio et al. | 55/306 |
| 3,465,950 | A | * | 9/1969 | Duffy et al. | 55/306 |
| 3,483,676 | A | * | 12/1969 | Sargisson | 55/306 |
| 3,811,254 | A | * | 5/1974 | Amelio | 55/306 |
| 4,456,458 | A | * | 6/1984 | Gilbertson | 55/306 |
| 4,644,806 | A | * | 2/1987 | Flagg et al. | 73/863.58 |
| 4,704,143 | A | * | 11/1987 | Percy | 96/421 |
| 5,106,397 | A | * | 4/1992 | Jaroszczyk et al. | 96/388 |
| 5,662,292 | A | | 9/1997 | Greene et al. | |
| 5,697,394 | A | | 12/1997 | Smith et al. | |
| 6,138,950 | A | * | 10/2000 | Wainfan et al. | 244/53 B |
| 6,264,137 | B1 | * | 7/2001 | Sheoran | 244/53 B |
| 6,302,932 | B1 | * | 10/2001 | Unger et al. | 55/306 |
| 6,595,742 | B2 | | 7/2003 | Scimone | |
| 6,598,384 | B1 | * | 7/2003 | Adkins | 60/39.092 |
| 2005/0126137 | A1 | * | 6/2005 | Wang | 55/498 |

OTHER PUBLICATIONS

Black Hawk T700 Barrier Filter Concept, Aerospace Filtration Systems (AFS), a division of Westar Corporation, Undated, 5 pages.

* cited by examiner

*Primary Examiner*—Minh-Chau T. Pham
(74) *Attorney, Agent, or Firm*—Senniger Powers (57) ABSTRACT

An air induction system for an engine to remove contaminants from intake air prior to delivery to the engine. The system includes an assembly for filtering air which is mounted in advance of the engine, and a duct for delivering air from the assembly to the engine. A sealing system is provided which prevents entry of unfiltered air while simultaneously permitting movement of the engine relative to adjacent parts of the airframe as engine power setting varies. The seal is protected from high pressures in the duct which can occur in operation of the engine.

12 Claims, 15 Drawing Sheets

ENGINE AIR FILTER AND SEALING SYSTEM

BACKGROUND OF THE INVENTION

This invention relates generally to air intakes for engines, and in particular to a system for mounting and sealing a barrier filter which protects an aircraft engine.

An engine for aircraft propulsion requires intake air that is free from contaminants to provide for efficient combustion and avoid internal damage. The compressor and turbine are designed with small tolerances between moving parts which maximize efficiency, but which also increase vulnerability to damage from small foreign particles. Contamination of intake air, even in a small amount, causes premature wear on engine components, increases maintenance costs, and degrades operational reliability. Unfortunately, aircraft are exposed to contaminants when operating at low altitudes where air is frequently contaminated with material from the ground, such as sand and dust. That problem is aggravated for helicopters due to rotor downwash and prolonged low-altitude operation.

Systems which remove foreign particles from intake flow have been developed to protect the engine from damage. In many instances, such a system includes an intake housing having a contaminant separator, such as a filter, positioned in advance of the engine inlet, with airtight seals at interfaces to prevent entry of unfiltered air. Effective sealing is difficult to implement and maintain because the engine moves relative to adjacent parts of the airframe as its power setting varies. For example, the front end of the engine may deflect about one inch as its power increases, with the movement being in a direction having all three directional components with respect to the airframe (e.g., forward, inboard, and down). Unfortunately, seals have been stiff or insufficiently flexible to move in this way while maintaining airtight integrity. They have typically been made of stiff materials because they are located where they must withstand pressure in the inlet. Further, seals are prone to fail when exposed to strong differential pressures if the engine should experience a surge instability that suddenly increases inlet pressure. Aggravating the difficulty is that the filter must be accessible for maintenance actions, cannot obstruct accessibility to the engine or airframe, and should not introduce loads to the inlet.

SUMMARY OF THE INVENTION

Among the several objects and features of the present invention that may be noted the provision of an engine intake air filtration system which effectively removes contaminants; the provision of such a system which is usable in existing aircraft without substantial modifications; the provision of such a system which readily permits movement of the engine relative to the surrounding airframe; the provision of such a system which is not adversely affected by unusually high pressures; the provision of such a system which minimizes loss and non-uniformity of pressure to the intake flow; the provision of such a system which is readily accessible for maintenance; the provision of such a system which is lightweight; and the provision of such a system which is economical.

In general, an air induction system of the present invention is for an engine to receive intake air, remove contaminants from the intake air, and provide the intake air for delivery to the engine. The system comprises a housing having a hollow interior with at least one entryway for receiving intake air into the housing, a contaminant separator for removing contaminants from the air, and an exit for discharge of air from the housing. A duct is positioned adjacent the exit of the housing to receive intake air therefrom for delivering the air to the engine. The duct has an inside defining an internal flow path for intake air and an outside. A seal is positioned between the housing and the duct for preventing passage of air therethrough. The seal is disposed between the outside of the duct and the housing such that the seal is not exposed to air flowing in the internal flow path of the duct.

In another aspect, an air induction system of the invention is for an aircraft engine to remove contaminants from intake air and deliver the air to the engine. The system comprises a contaminant removal assembly for receiving intake air and removing contaminants from the air. The assembly has at least one entryway for receiving intake air and an exit for discharge of the air from the assembly. A duct is configured to receive intake air from the assembly for delivery to the engine. A flexible and resilient seal is positioned between the assembly and the duct for preventing entry of contaminated air. The seal permits relative movement between the duct and the assembly in any direction while maintaining a seal between the duct and the assembly.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
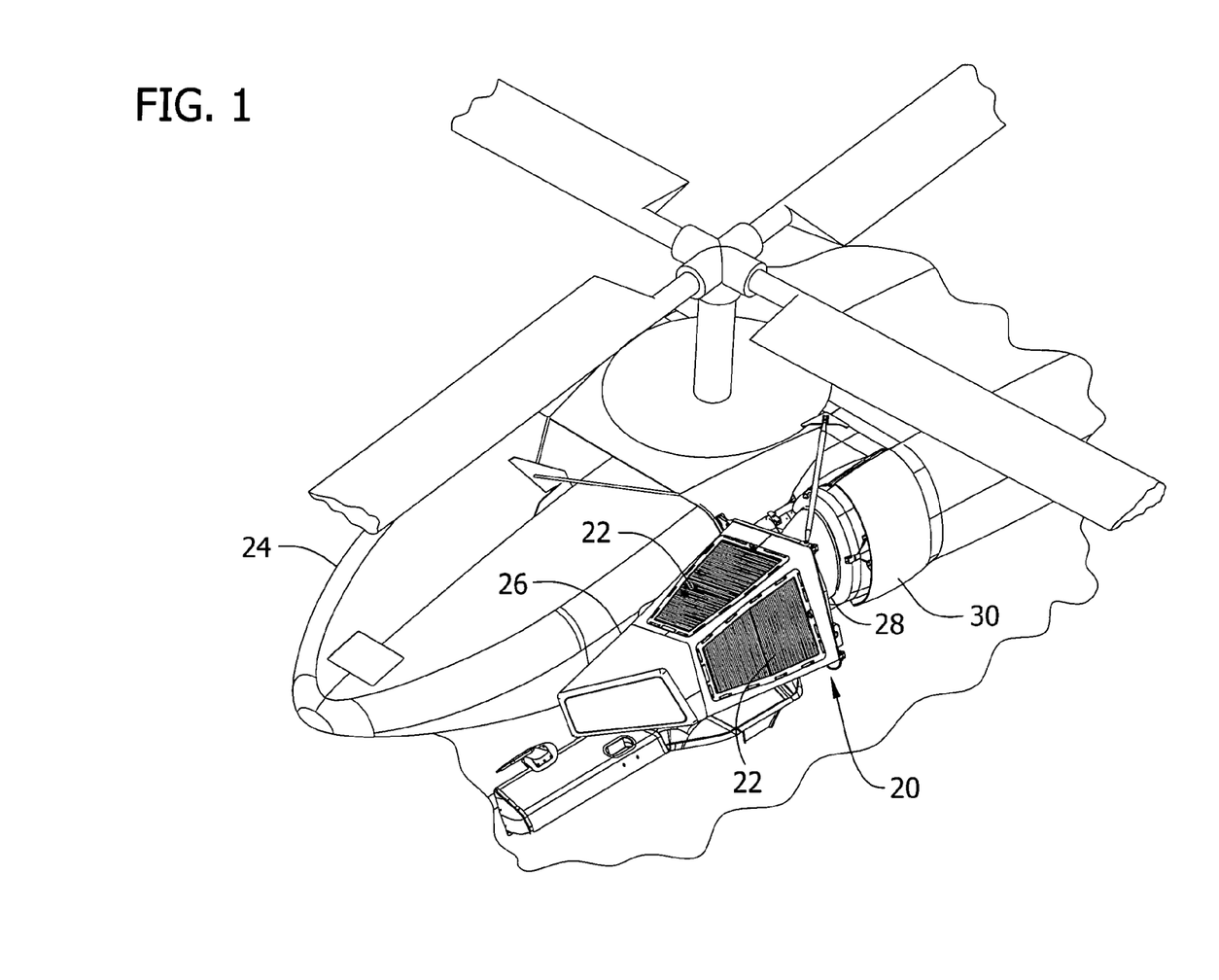
FIG. 1 is a fragmentary perspective of a helicopter having an air induction system according to the present invention.

Referring now to the drawings and in particular to FIG. 1, an air induction system of the present invention is designated generally by 20. The system 20 includes filters 22 for protecting an engine (not shown) from ingestion of contaminant particles. The system is primarily intended for use with a gas turbine engine which is installed in an aircraft 24, such as a UH-60 Blackhawk helicopter. However, it is understood that the system 20 can be used with other types of airbreathing engines, for installation at a facility or factory, or for use on a portable cart, without departing from the scope of this invention.

The system 20 includes a nacelle 26 and a transition duct 28 which are positioned forward of an inlet 30 and which provide intake air to the inlet for delivery to the engine. There are two such systems 20 aboard the helicopter 24 for two corresponding inlets 30. The nacelle 26 comprises a housing having four outer sides and a hollow interior, each side having an opening which mounts a filter panel 32 having a filter 22 for receiving intake air into the housing. The shapes and sizes of the nacelle 26 and filters 22 may be selected to fit the particular aircraft with a configuration producing a favorably mechanical and aerodynamic integration, and alternate shapes or configurations do not depart from the scope of this invention. Moreover, the number and orientations of the filter panels may vary.

The nacelle 26 has a forward-facing door 34 which is movable between a closed position and an open position. A conventional actuator (not shown) for moving the door 34 is located in the interior of the nacelle. During normal operation, the door 34 remains closed so that all intake air must enter the nacelle 26 in a generally radial direction through one of the filters 22 in a corresponding filter panel 32. During operation when the filters 22 have become laden with dirt or become clogged, the door 34 is opened, defining a alternate, bypass passageway so that the engine has sufficient air to continue operation. The door 34 is swept at an acute angle with respect to the forward direction to reduce aerodynamic drag and reduce impact force from bird strikes.

Figure 2:
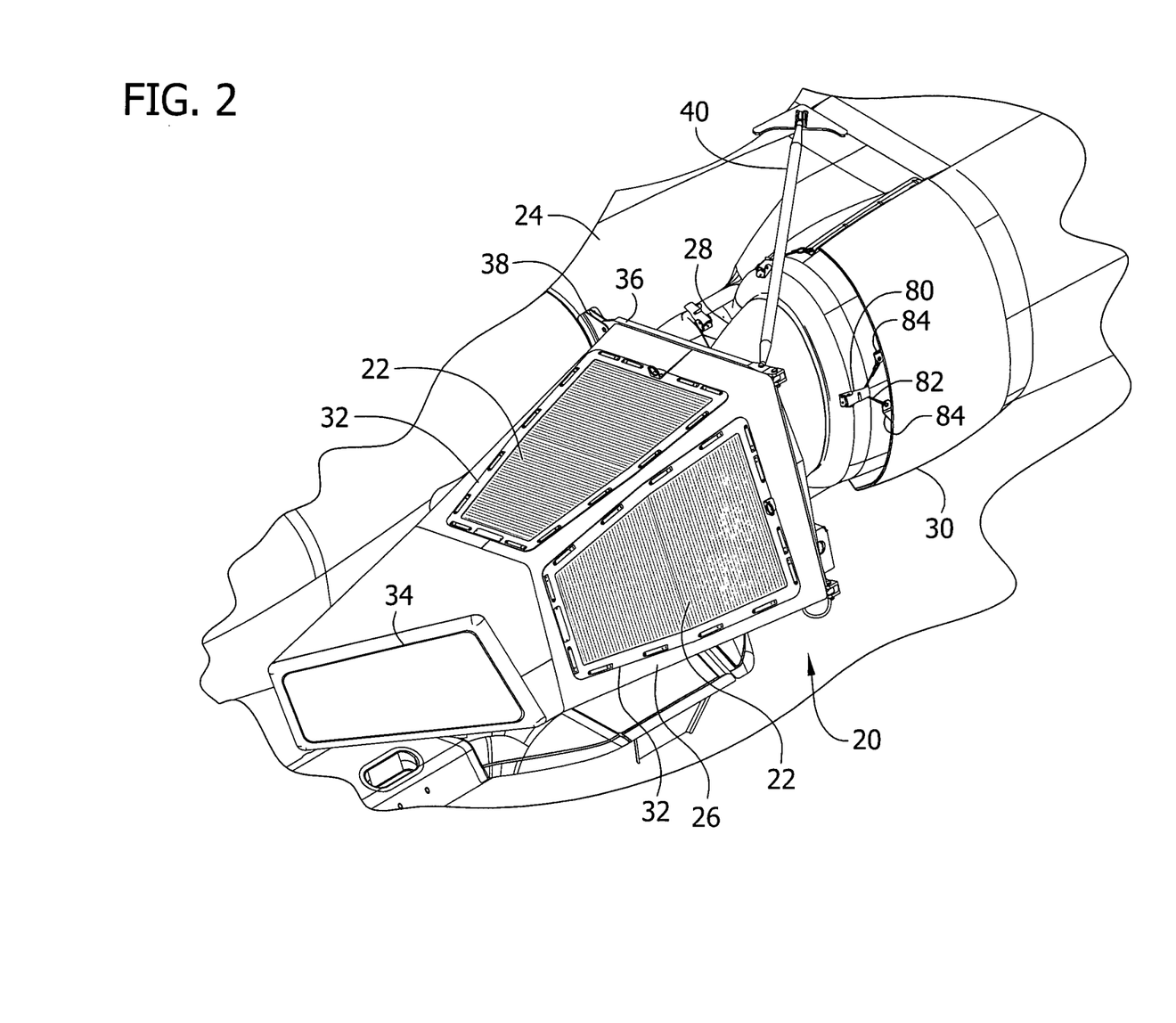
FIG. 2 is an enlarged portion of FIG. 1.
Figure 6:
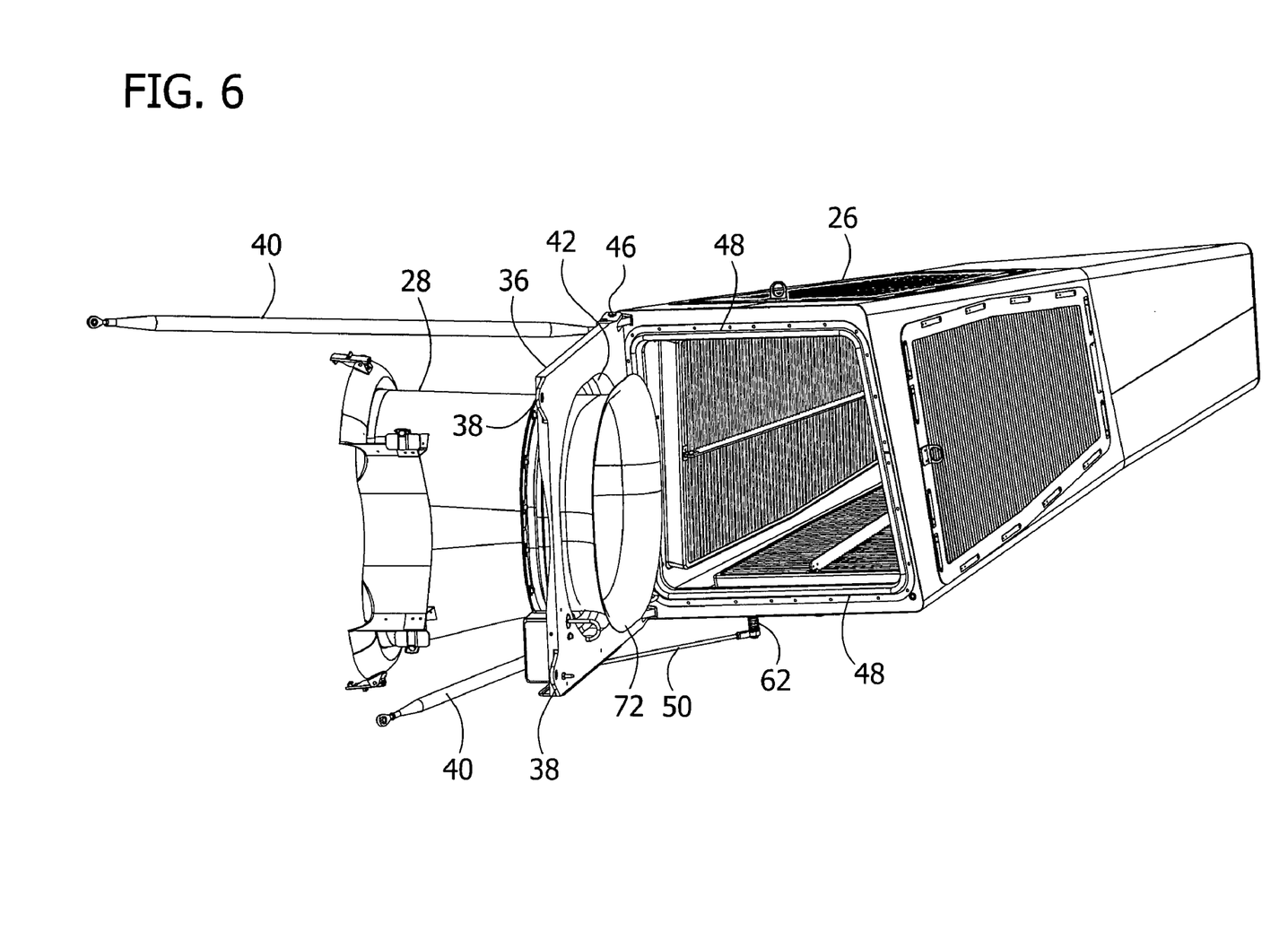
FIG. 6 is a perspective of the nacelle swung to an open position.
Figure 11:
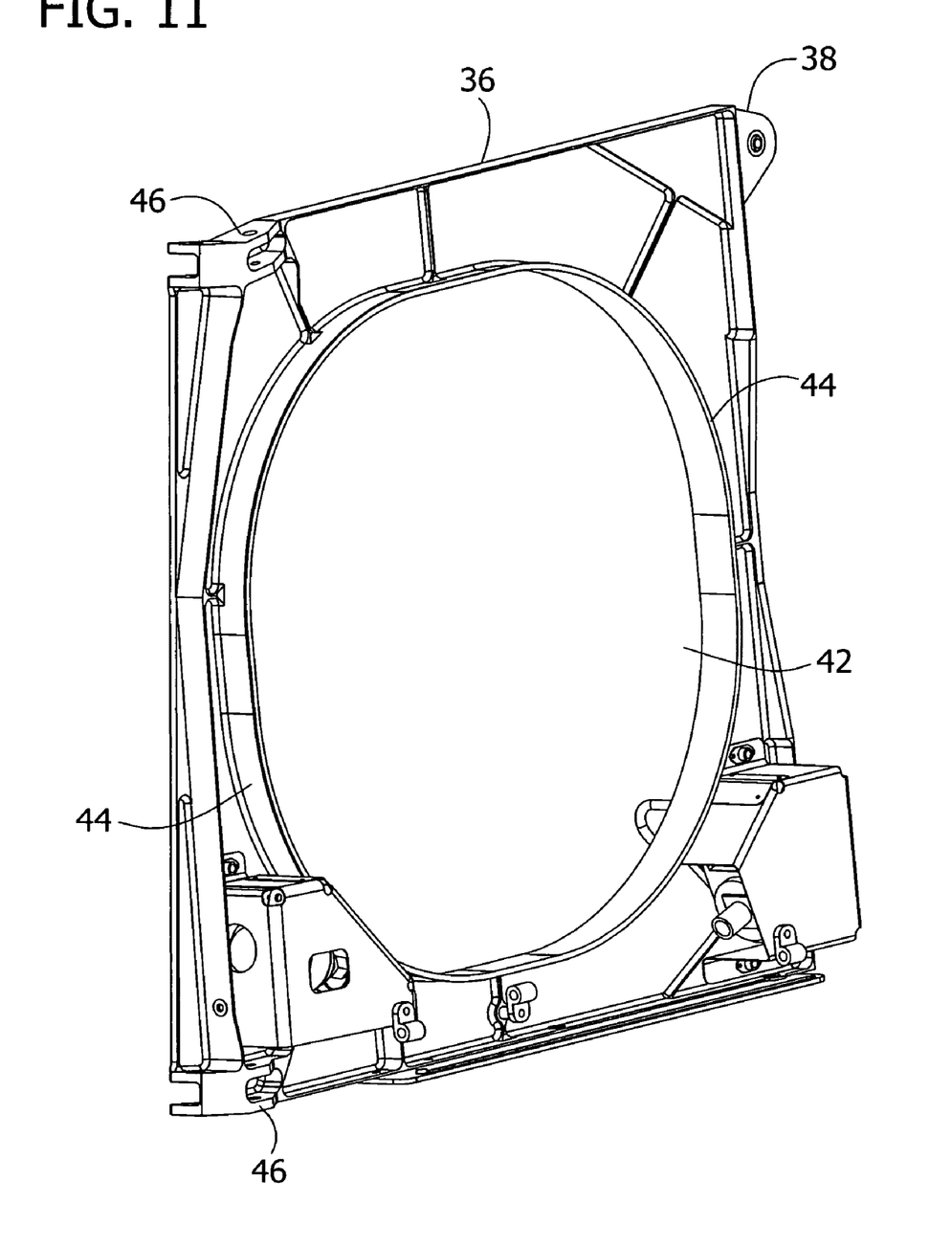
FIG. 11 is a perspective of a frame for supporting the nacelle.

The nacelle 26 is supported directly by the airframe of the aircraft 24 so that forces on the nacelle are not transmitted to the engine. A rectangularly-shaped frame 36 (FIGS. 2, 6, and 11) at a rearward side of the nacelle is fixedly attached to the airframe structure by bolts at fastening formations 38 and by upper and lower struts 40. The frame 36 provides a mount for the nacelle 26, and it bears the weight and aerodynamic forces of the nacelle. Other configurations for supporting the nacelle do not depart from the scope of this invention. The frame 36 may have a one-piece construction (i.e., a plate) or may be an assembly of two or more components. An opening 42 in the frame 36 defines a nacelle exit for discharge of air from the nacelle 26 toward the engine. A flange 44 (FIG. 11) extending around the opening projects axially (toward the engine) from the frame 36.

Figure 3:
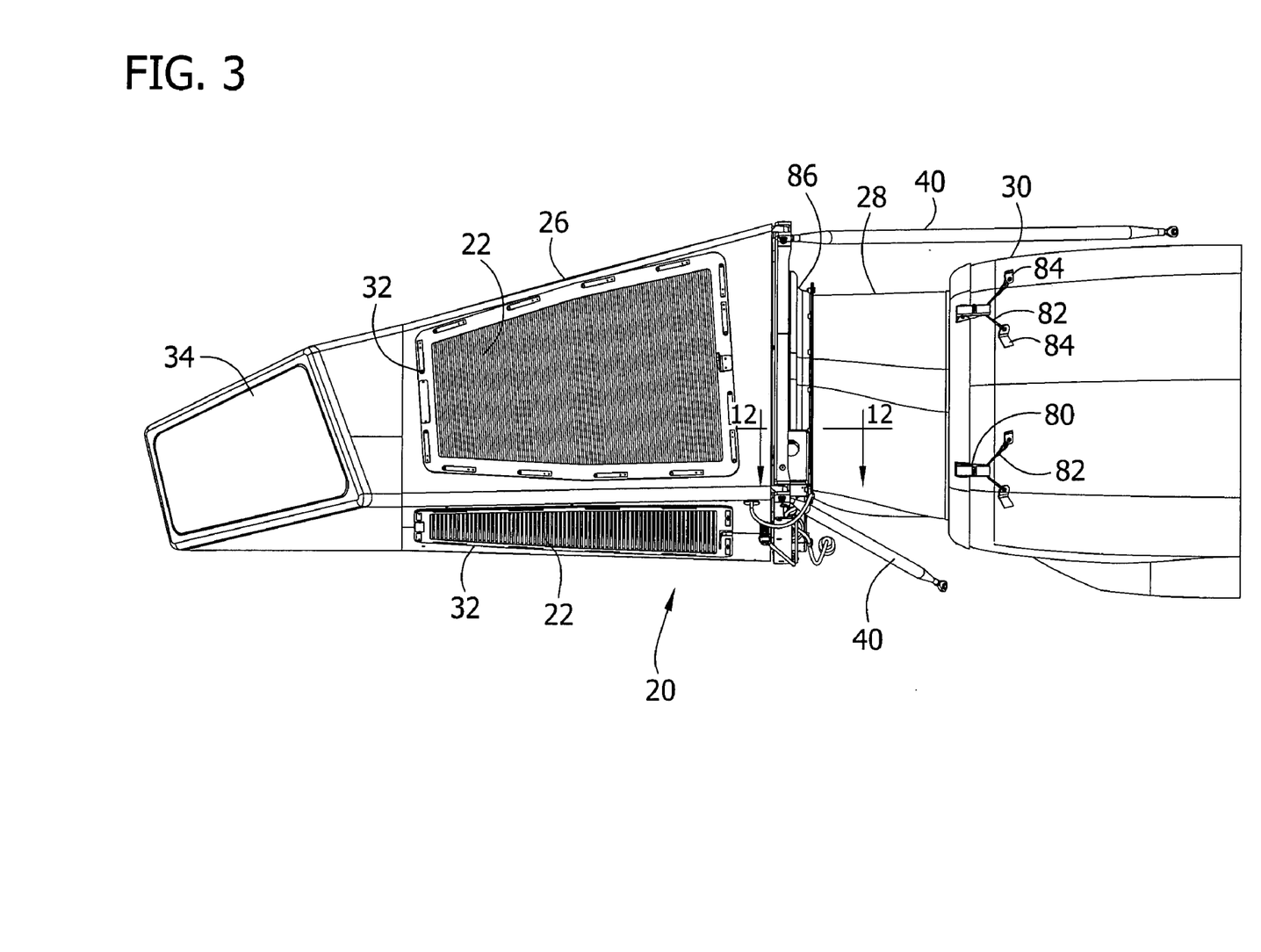
FIG. 3 is an elevation of a nacelle, duct, and inlet of the air induction system.
Figure 7:
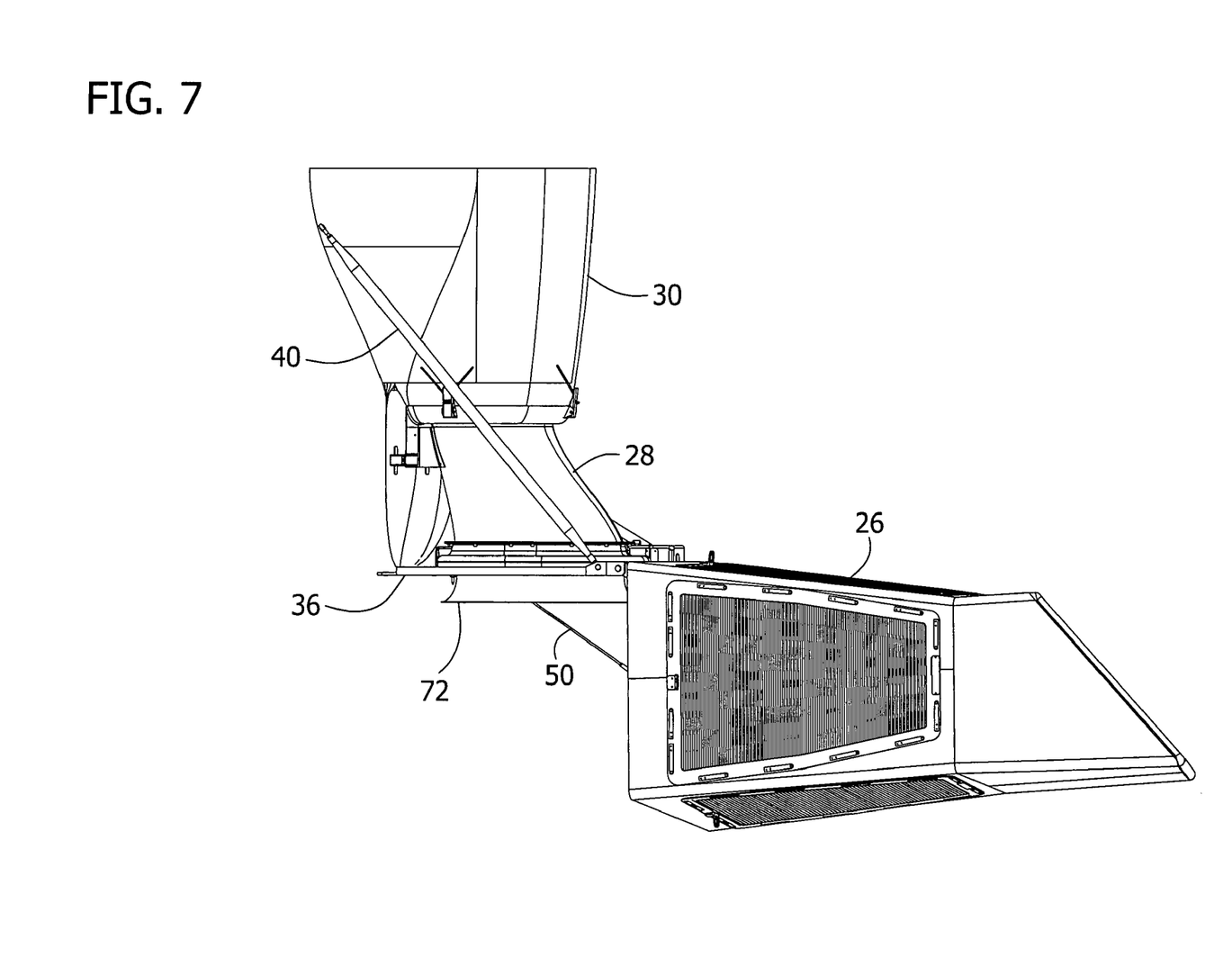
FIG. 7 is a top plan of the nacelle swung to the open position.

The nacelle 26 is attached to the frame 36 by hinges 46 for swinging motion between a closed position (FIGS. 1–3) for engine operation and an open position (FIGS. 6 and 7) for maintenance, cleaning, or inspection. At the closed position, the frame 36 defines an end wall of the hollow interior of the nacelle 26. A bulb seal 48 (FIG. 6) extends around the rear of the nacelle for engaging the frame 36 and sealing the interface between the nacelle and frame so that unfiltered air cannot enter the nacelle. Two removable pins (not shown) are provided to secure the front of the nacelle 26 to the airframe when the nacelle is at the closed position. A person may unfasten the pins and swing the nacelle 26 from the closed position to the open position. At the open position, maintenance personnel have ready access to the filter panels 32 for cleaning or replacement, and can see directly through the duct 28 to the engine face for visual inspection. Moreover, in the open position, the nacelle is swung away from the helicopter fuselage providing unhindered access for a maintenance person to reach the upper side of the helicopter 24.

Figure 8A:
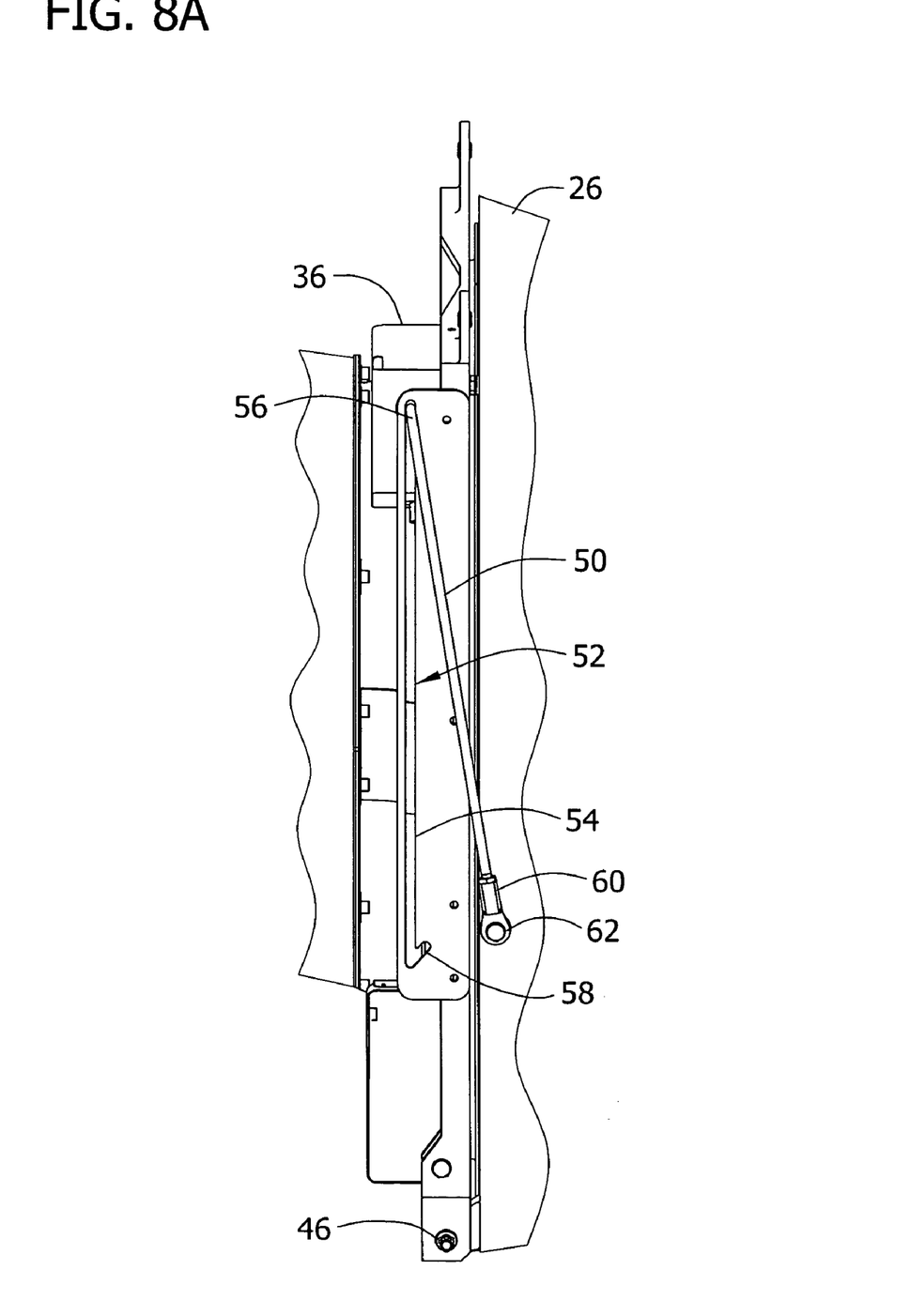
FIG. 8A is a fragmentary bottom plan of the air induction system at the junction of the duct and the nacelle with the nacelle at the closed position.
Figure 8B:
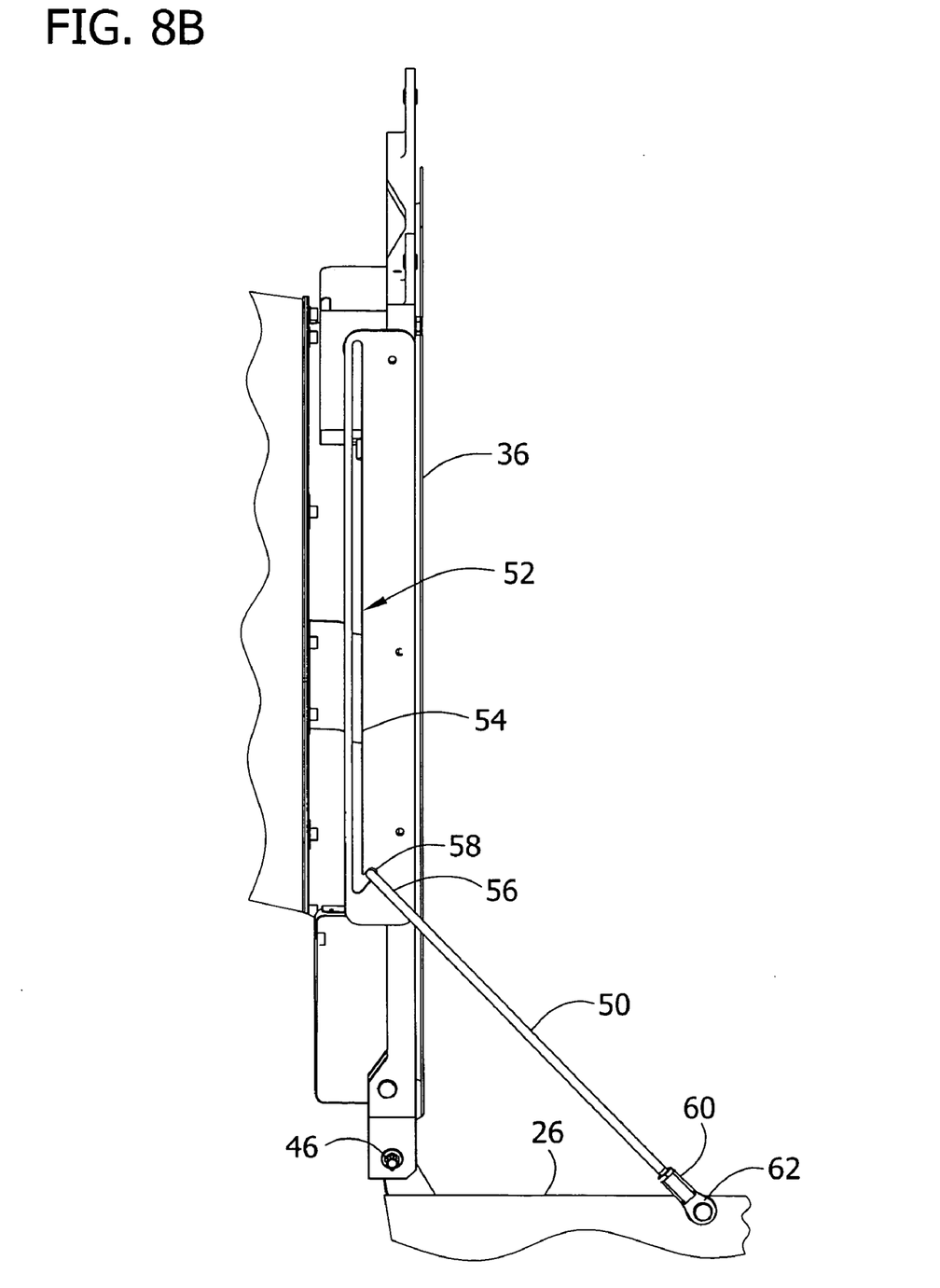
FIG. 8B is a view similar to FIG. 8A with the nacelle at the open position.

A rod 50 (FIG. 6) secures the nacelle 26 at the open position so that it will not inadvertently move, such as when struck by a gust of wind or when the helicopter 24 rests on an incline. As shown in FIGS. 8A and 8B, a slot (indicated generally at 52) extends along a lower surface of the frame 36. The slot 52 has a linear portion 54 and receives a first end 56 of the rod 50 for sliding motion therein to guide movement of the rod as the nacelle swings open. The slot has an end 58 which extends at an angle from the linear portion 54 and defines a locking position for the rod 50. A second end 60 of the rod 50 is secured to a lower surface of the nacelle 26. As the nacelle swings from the closed position (FIG. 8A) to the open position (FIG. 8B), the first end 56 of the rod slides along the slot 52. Upon reaching the end of the linear portion 54 of the slot (where the nacelle is at the full open position), the first end 56 of the rod automatically snap-locks into the angled end 58 of the slot. A torsional spring 62 (FIG. 6) at the second end 60 urges the rod 50 to the locking position, thereby automatically locking the rod, and holds it at that position until manually released. Other configurations for guiding movement of the nacelle and securing it do not depart from the scope of this invention.

Figure 4:
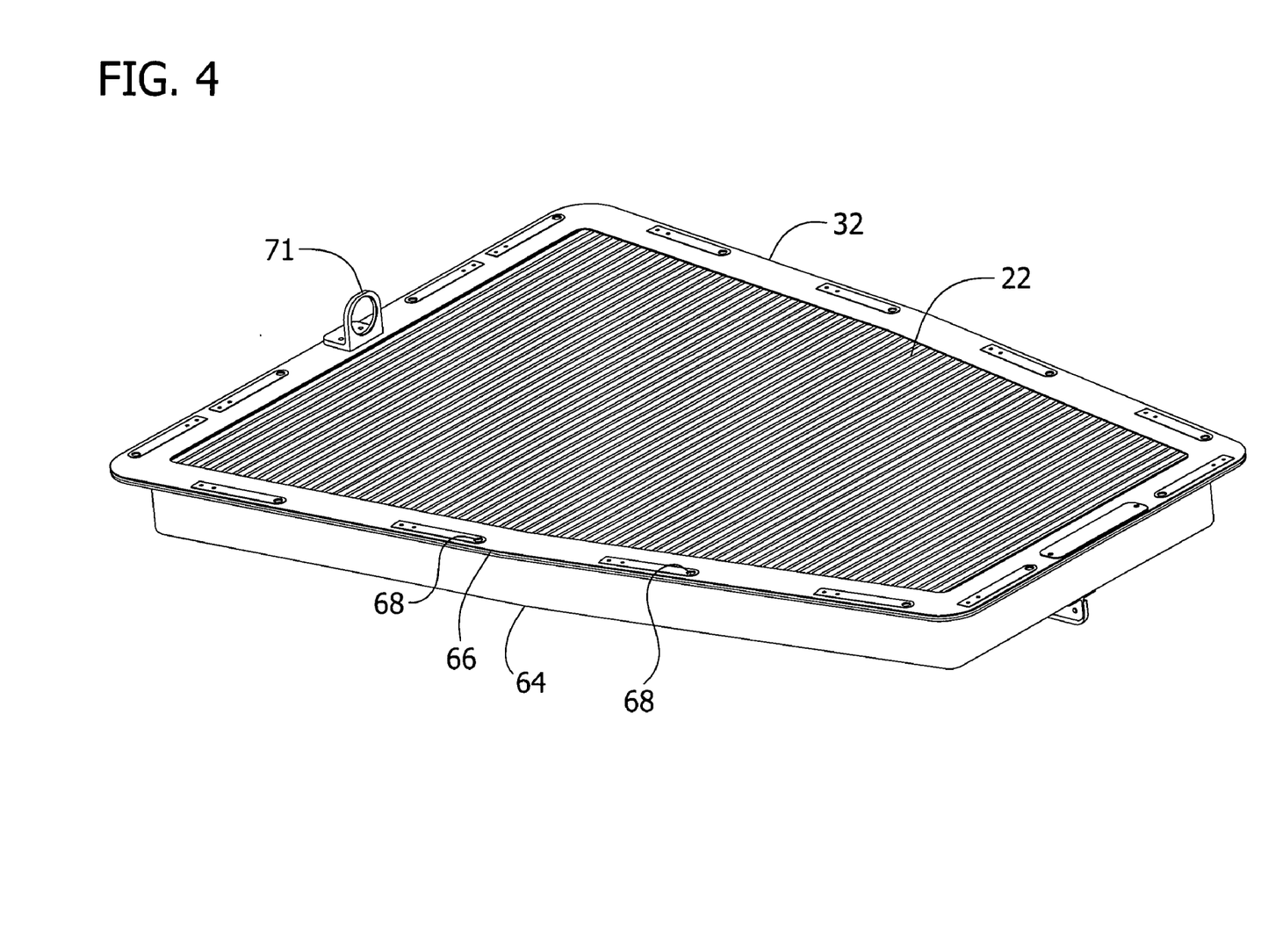
FIGS. 4 and 5 are front and rear perspectives of a filter panel for use in the nacelle.
Figure 5:
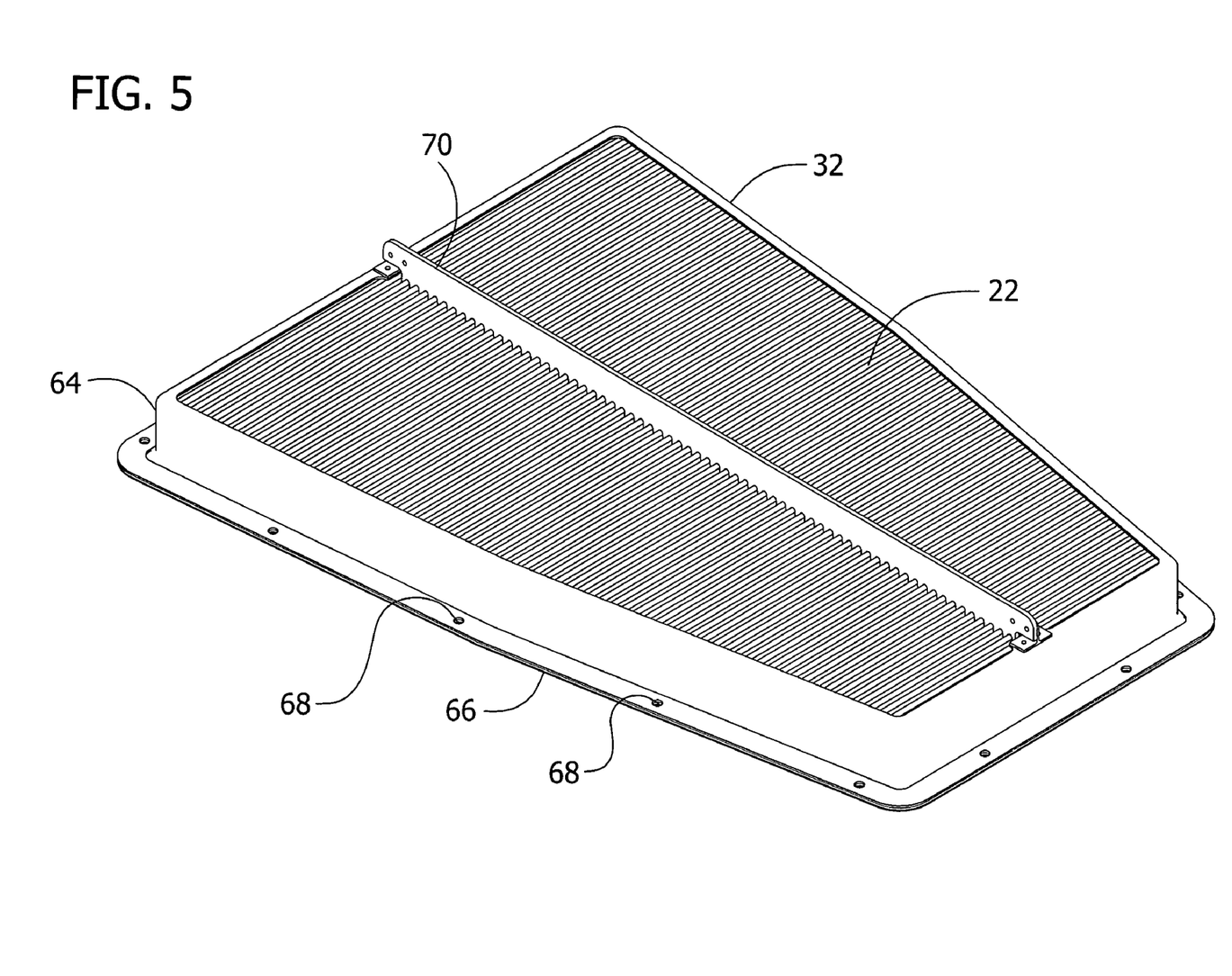

Each filter panel 32 (FIGS. 4 and 5) includes a pleated barrier filter element 22 mounted in a retention frame 64 which securely retains the filter element in place, yet allows for its easy replacement. The retention frame 64 engages edges of a corresponding opening in the nacelle 26, forming a seal such that all air must pass through the filter element 22 to reach the interior of the nacelle. A rim 66 of each filter panel 32 has holes 68 for receiving fasteners (not shown) to connect to the nacelle 26. An exemplary material for the retention frame 64 is aluminum, although other materials may be used. The filter element 22 is held in place in the retention frame 64 by a suitable adhesion or physical connection, such as by a polymeric potting material such as polysulphite or polyurethane, or by an epoxy. The potting material functions as a sealant to seal the perimeter (i.e., side edges) of the filter element 22, structurally adhering it to the retention frame 64 and preventing unfiltered air from passing between the retention frame and the filter element. Each filter is constructed such that if it should become plugged with contaminants to a degree where adequate airflow can not be provided to the engine, maintenance personnel can readily clean the barrier filter media by backflushing with a spray of water.

Pleating of the barrier filter element 22 effectively increases the surface area and rigidity of the filter element. The filter element is effective at separating contaminants from the air and provides a low pressure drop characteristic across the filter. The filter element 22 is constructed of filter media capable of achieving high particle removal efficiencies. The filter media is made of a lightweight material that will also be resistant to damage by water and other liquids it may encounter in operation. Preferred filter media includes woven cotton or polyester or a felt. When cotton is employed as the filter media, the filter media is preferably a cotton grid fabric comprised of a plurality of overlapping layers of woven cotton material. Preferably, the number of layers is in the range of from 3 to 6. The filter media may be strengthened by a stainless steel screen (not shown) which lines the filter media. To improve the filter efficiency for finer particles, the filter media may be impregnated with oil, which not only improves particle removal, but also helps resist moisture absorption by the filter media rendering it waterproof. A comb 70 (FIG. 5) extends across a center of the backside of each filter panel 32 to strengthen and maintain separation of the pleats. A lift ring 71 (FIG. 4) is used to assist in installation, removal and transporting of filter panels.

It is understood that contaminant separators of various other configurations, such as non-pleated filters, filters formed with a different construction, and non-filtering inertial particle separators, do not depart from the scope of this invention.

Figure 9A:
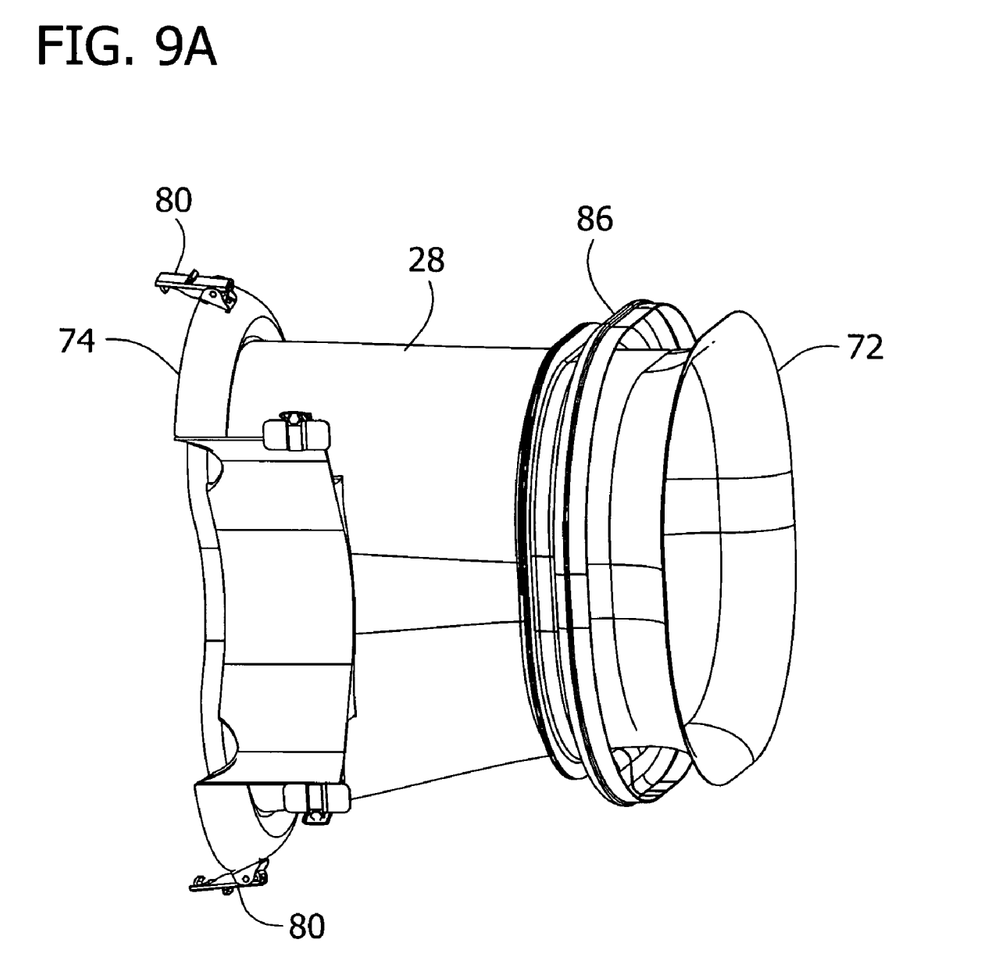
FIGS. 9A and 9B are perspectives of the duct with a seal installed around an outer circumference.

The duct 28 (FIGS. 6, 9A, and 9B) receives intake air from the interior of the nacelle 26 and delivers it to the engine inlet 30. A front of the duct 28 is positioned generally at the exit of the nacelle 26, and it is sized and shaped to fit through the opening 42 of the frame 36. There is no engagement of the frame 36 by the duct 28. Rather, the duct 28 is suspended within the opening 42. A bell-mouth shaped end 72 draws a smooth stream of intake air with minimal loss of pressure and minimal non-uniformity to flow properties across the stream. The contours of the duct 28 change the cross-section of the stream from a generally circular shape at its front end 72 to a bent oval, or kidney shape (FIG. 9B) at its back end 74 corresponding with a shape of the inlet 30. The duct 28 has a length, contour, and shape which are highly dependent on the particular aircraft and inlet upon which it is installed. These parameters may differ from the illustrated embodiment, or there may be no duct distinct from that of the inlet, without departing from the scope of this invention. When installed, the outer surface of the duct 28 is spaced from the opening of the frame 36 to permit relative movements without contact therebetween. Because the duct 28 is preferably formed of a rigid and lightweight material (e.g., a brittle composite such as a carbon fiber reinforced epoxy resin), any contact with the frame 36 could cause damage. Typically, a spacing between the outer surface of the duct and edge of opening 42 is about two inches, which provides adequate separation.

Figure 9B:
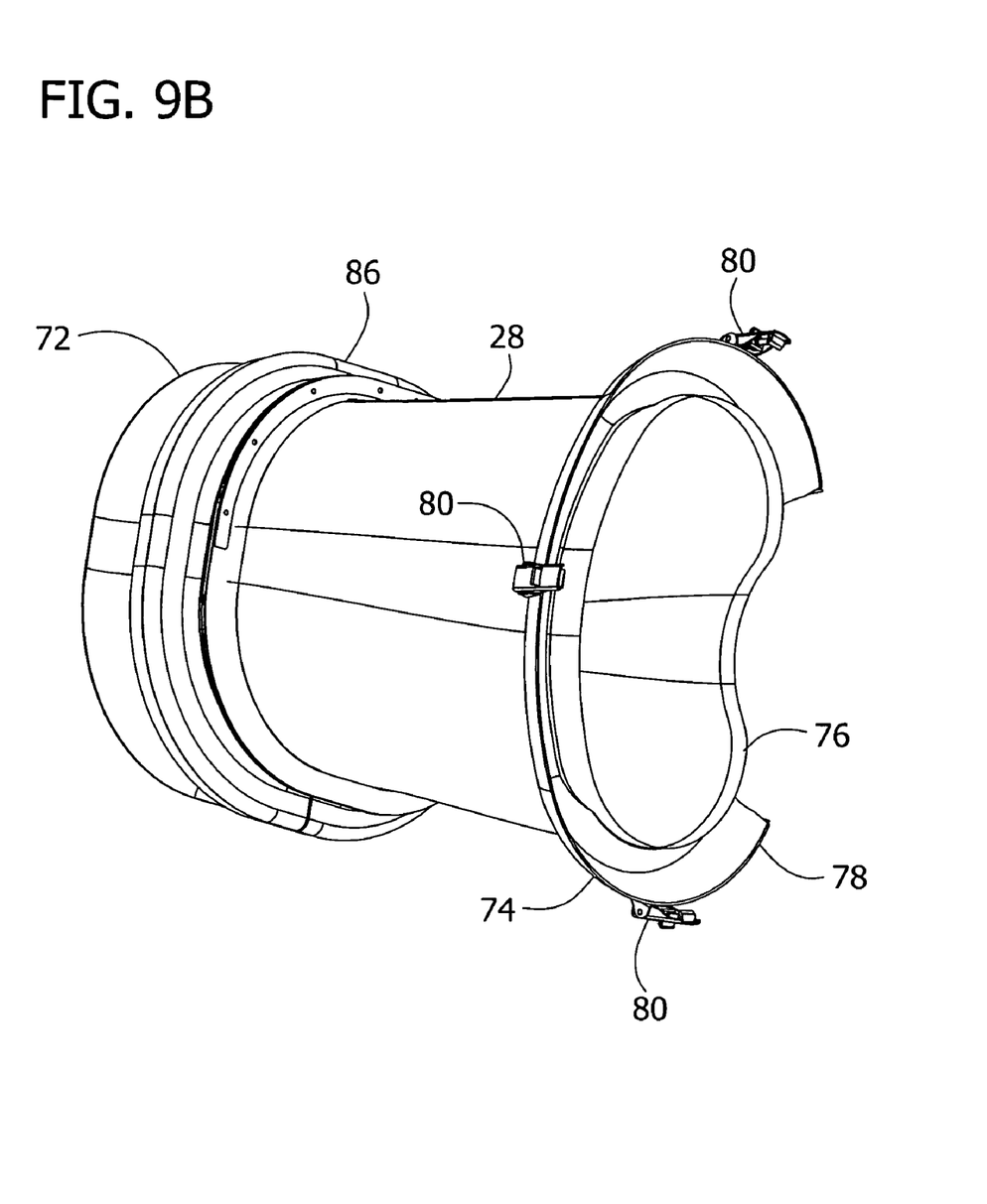

The duct 28 is attached to and supported by the inlet 30 (which in turn is supported by the engine) such that the duct and inlet move conjointly with the engine as power varies and the engine shifts position in the airframe. As shown in FIG. 9B, the back end 74 of the duct comprises an inner portion 76 for being received inside the inlet 30 and an outer portion 78 comprising a skirt which engages the outer surface of the inlet. The skirt 78 forms an interface having a smooth contour and generally airtight connection. Because the duct 28 moves with the engine, seals between the inlet and duct at the back end 74 of the duct have no requirement to compensate for relative motions and may therefore be simple and lightweight. For example, the skirt 78 may be formed of a ³⁄₁₆-inch thick soft foam rubber. A similar internal soft blade seal (not shown) may be positioned at the junction of the inner portion 76 of the duct and the inlet 30. Several latches 80 are provided on the outer side of the duct 28 for connection to cables 82 (FIG. 3) on the exterior of the inlet 30. The cables 82 extend between anchors 84 which are fastened to the inlet 30. Preferably, the anchors 84 use pre-existing fastener holes such that the helicopter 24 does not require modification or driling of holes when fitted with the system 20 of the present invention.

A flexible and resilient seal 86 is positioned between the nacelle 26 and the duct 28 for preventing entry of unfiltered air through the opening 42 of the frame 36 between the outer surface of the duct and the edge of the opening. The seal 86 extends around an outer circumference of the duct 28, and is preferably a single piece or band of flexible material with its ends bonded or spliced together forming a ring shape.

Significantly, the seal 86 is positioned outside the duct 28 such that the seal is not exposed to air flowing in the flow path inside the duct. Therefore, the seal 86 is unaffected by pressures in the duct 28, including particularly a sudden rise in pressure due to a surge instability in the engine. Because the seal 86 is not exposed to high pressures, it can be more lightweight and flexible. The seal permits relative movement between the duct 28 and the nacelle 26 without contact therebetween, thereby precluding the possibility of damage. Moreover, the airtight seal between the duct and nacelle is maintained. The seal 86 is formed of a suitably elastic material which permits movement of the duct relative to the nacelle in a direction having any or all three directional components with respect to the airframe (i.e., longitudinal, lateral, and elevational) without binding or failing. The seal 86 may be stretched a significant distance (e.g., twice its unloaded dimension(s)) without damage, and will return to its original position when unloaded. Preferably, the material is lightweight and inexpensive. An exemplary material is silicon rubber.

Because the seal 86 does not form a portion of the surface exposed to the airstream, an additional length may be included to create a slack or "baggy" portion which further facilitates relative movement. In one embodiment, additional length is provided for slack of about twice the length required (e.g., unloaded length of four inches instead of two).

Figure 10A:
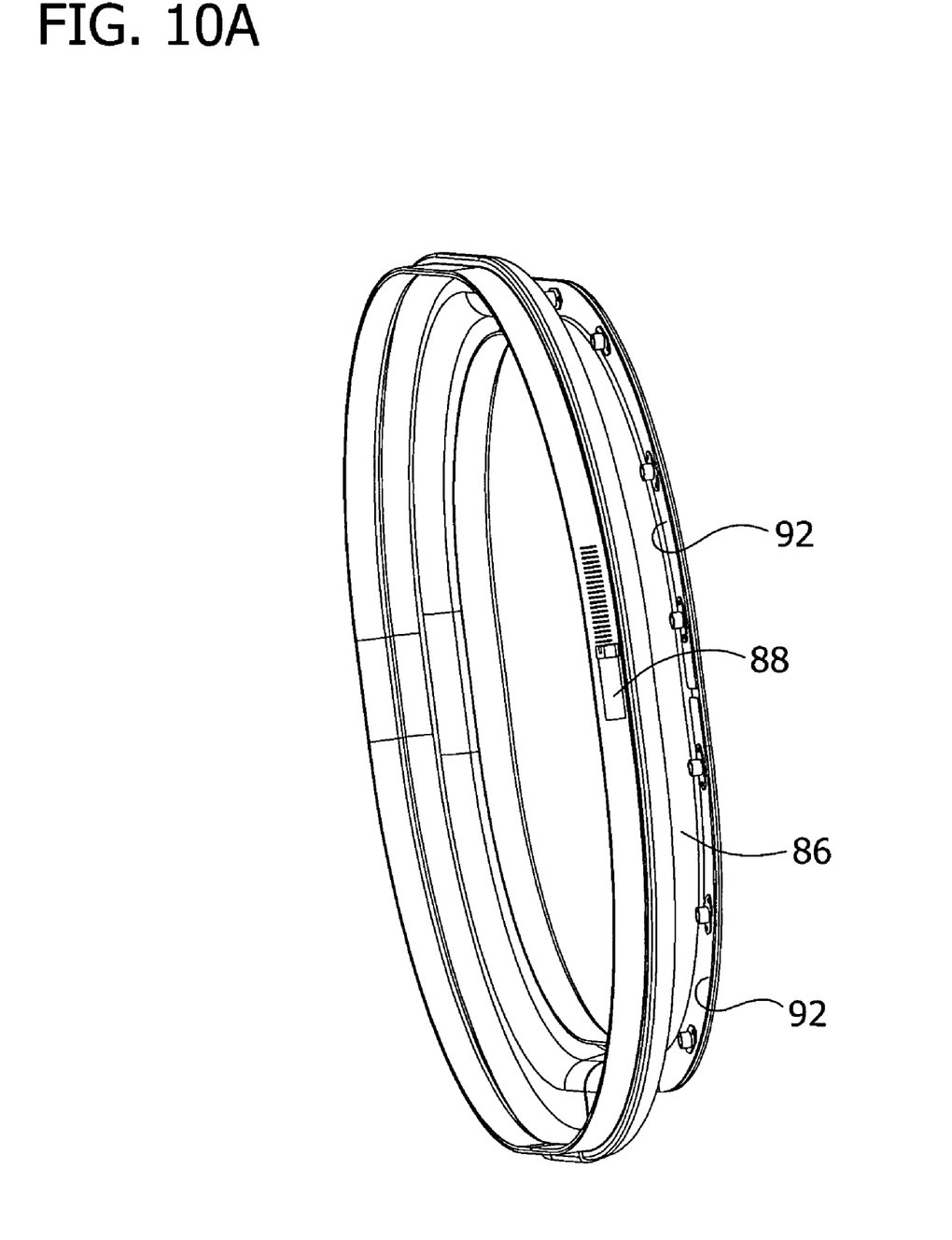
FIGS. 10A and 10B are front and rear perspectives of the seal.
Figure 10B:
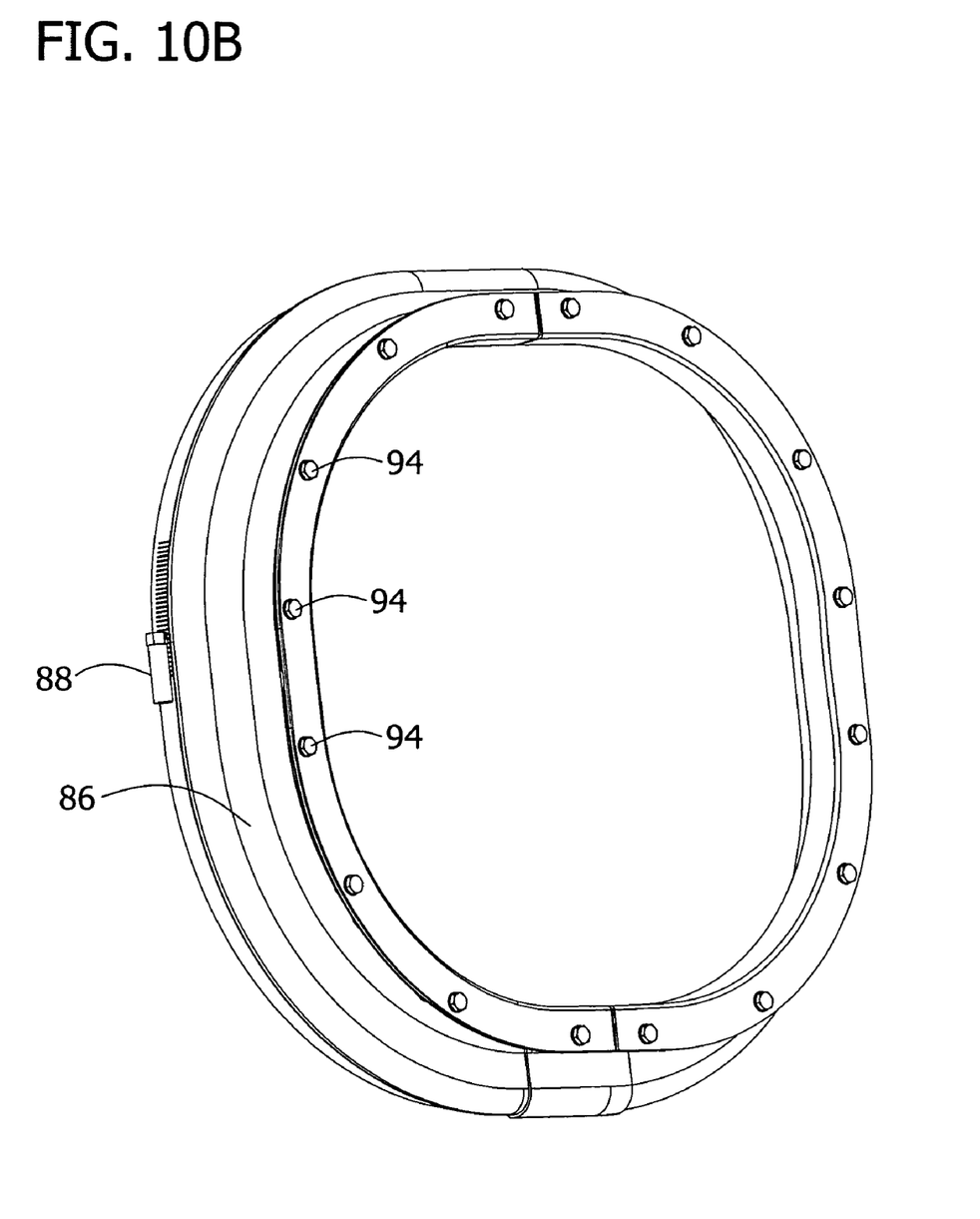
Figure 12:
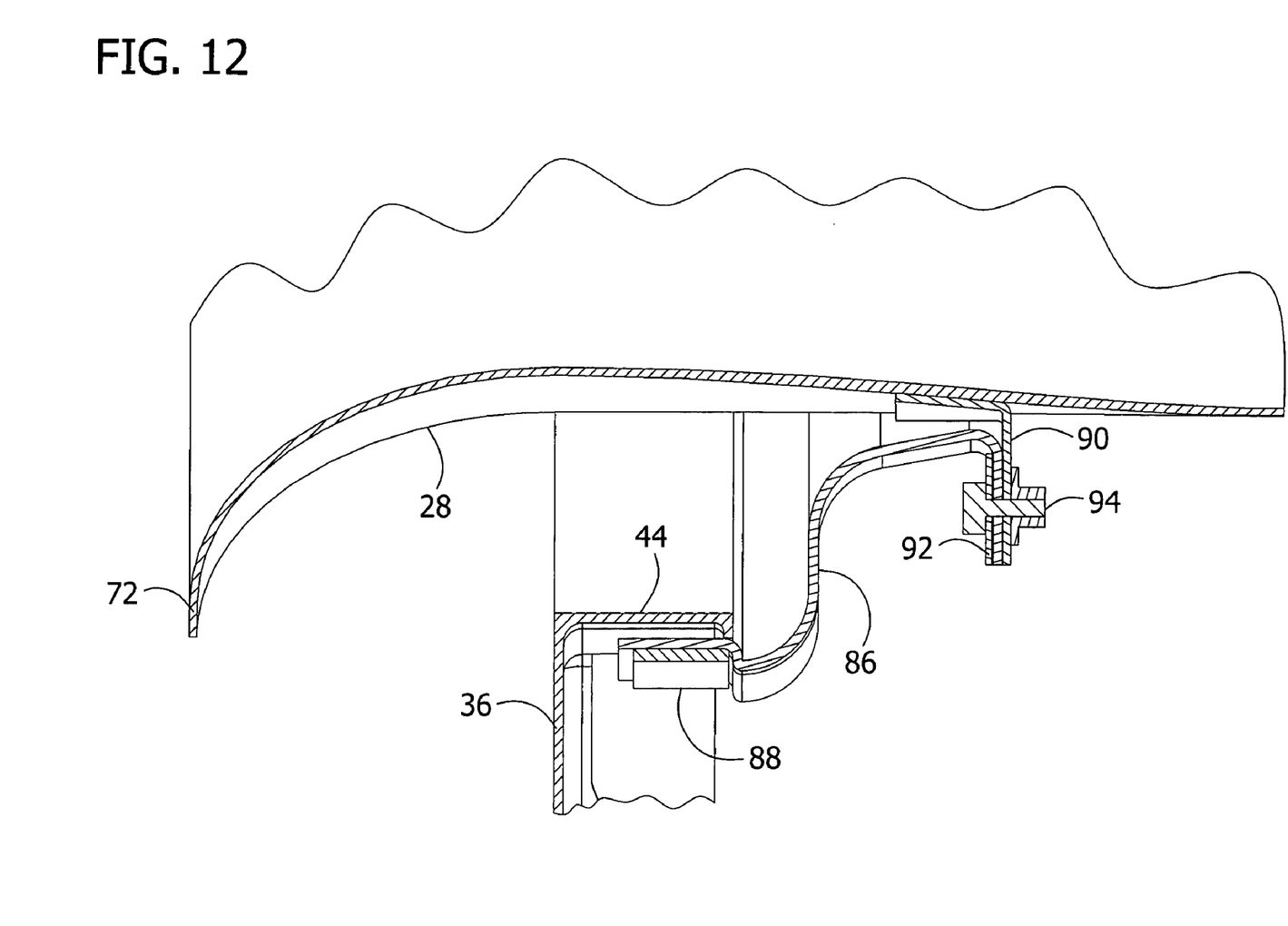
FIG. 12 is a section taken along line 12—12 of FIG. 3.

Referring to FIG. 12, the seal 86 is clamped on opposite edges. A first edge is attached to the frame 36 by fitting it around the flange 44 extending around the frame opening 42. A conventional band clamp 88 (FIG. 10A) extends around the flange 44 and tightens against the seal 86 to hold it firmly against the flange 44. The seal 86 is attached to the duct 28 by clamping it between a ring 90 and retainer plate 92, as shown in FIG. 12. The ring 90 is a rigid protrusion having an L-shaped body which is fixed to the outer surface of the duct 28 by an epoxy or other suitable method. Preferably, the ring 90 is formed of a lightweight composite material, such as a carbon fiber reinforced epoxy resin. Several thin retainer plates 92 (e.g., two) are spaced around the circumference of the duct 28 and are attached to the ring 90 by suitable fasteners 94, such as a bolt or rivet. Each retainer plate 92 holds the seal 86 in sandwiched position against the ring 90. Other systems for holding the seal in position do not depart from the scope of this invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. An air induction system for an aircraft engine to remove contaminants from intake air and deliver the air to the engine, the system comprising:
   a nacelle comprising a housing having outer sides and a hollow interior, at least one side having an opening with a filter panel mounted therein for receiving intake air into the housing, an exit opening located in the housing for discharging air received into the housing through the filter panel toward the engine, a flange projecting axially from the housing and extending around the exit opening in the housing;

a transition duct for directing intake air exiting the exit opening of the housing toward the engine, the duct being attached to and supported by the engine, a portion of the duct being positioned through the exit opening in the housing and suspended within the opening, an outer surface of the duct being spaced from an edge of the exit opening so that the duct can move conjointly with the engine and with respect to the nacelle without the duct engaging the housing of the nacelle, the portion of the duct received in the housing having a bell-mouth shaped end for receiving intake air; and a flexible and resilient seal positioned between the housing of the nacelle and the duct for preventing entry of unfiltered air through the outer surface of the duct and the edge of the exit opening, the seal extending around the outer surface of the duct such that the seal is not exposed to air flowing in the flow path inside the duct, the seal being formed from an elastic material for permitting relative movement between the duct and the housing of the nacelle while maintaining an airtight seal between the duct and the housing, the seal being stretchable to about twice its unloaded length without damaging the seal, the seal including a slack portion equal to about twice the length required for the seal.

2. An air induction system as set forth in claim 1 wherein the seal comprises an annular band clamped along opposite edges to the housing and duct.

3. An air induction system as set forth in claim 1 wherein the seal is made of silicon rubber.

4. An air induction system as set forth in claim 1 wherein the housing further comprises a frame at a back end of the nacelle, the frame having an opening therein comprising said exit.

5. An air induction system as set forth in claim 4 wherein the seal extends between the outside of the duct and the opening in the frame.

6. An air induction system as set forth in claim 5 wherein the duct has a rigid protrusion on its outside, the seal being clamped against the protrusion.

7. An air induction system as set forth in claim 6 wherein the protrusion comprises an L-shaped body extending in a ring around the outside of the duct.

8. An air induction system as set forth in claim 1 wherein the housing further comprises a frame on a back end of the nacelle, the nacelle being hinged to the frame for swinging movement between a closed position for engine operation and an open position for maintenance.

9. An air induction system as set forth in claim 8 further comprising a rod which secures the nacelle at the open position so that it will not inadvertently move.

10. An air induction system as set forth in claim 9 wherein the rod has a first end secured to the frame and a second end secured to the nacelle, the first end being slidably movable in a slot attached to the frame.

11. An air induction system as set forth in claim 10 wherein the rod and slot are shaped and arranged to assume a locking position when the nacelle swings to the open position.

12. An air induction system as set forth in claim 11 further comprising a spring at the second end urging the rod to lock the nacelle at the open position.

* * * * *